United States Patent [19]
Datta

[11] Patent Number: 5,552,998
[45] Date of Patent: * Sep. 3, 1996

[54] METHOD AND APPARATUS FOR CALIBRATION AND CONTROLLING MULTIPLE HEATERS

[75] Inventor: James R. Datta, Winona, Minn.

[73] Assignee: Watlow/Winona, Inc., Winona, Minn.

[*] Notice: The term of this patent shall not extend beyond the expiration date of Pat. No. 5,280,422.

[21] Appl. No.: 406,126

[22] Filed: Mar. 17, 1995

Related U.S. Application Data

[63] Continuation-in-part of Ser. No. 182,716, Jan. 18, 1994, which is a continuation-in-part of Ser. No. 609,390, Nov. 15, 1990, Pat. No. 5,280,422.

[51] Int. Cl.[6] .................................................. G12B 13/00
[52] U.S. Cl. ...................... 364/571.01; 324/601; 219/398
[58] Field of Search .............................. 364/557, 571.01, 364/571.04, 571.07; 219/662, 262, 395, 398; 340/825.08, 825.1; 324/601, 721

[56] References Cited

U.S. PATENT DOCUMENTS 5,280,422  1/1994  Moe et al. ............................... 364/140

Primary Examiner—Ellis B. Ramirez
Assistant Examiner—Thomas Peeso
Attorney, Agent, or Firm—Herzog, Crebs & McGhee

[57] ABSTRACT

Multiple heaters are calibrated and controlled by a microcomputer, and a multiplexer for this system. The heaters are sequentially sampled and resistance calculated from voltage and current measurements. The operator enters a temperature for the calculated resistance to establish a calibrated resistance value. During run, the computer energizes and samples each heater to calculate its resistance. The calculated resistance if divided by the calibrated resistance to determine a resistance ratio. A look-up table is stored in the computer having resistance ratios for corresponding temperature. The computer compares the calculated ratio to that of the look-up table to determine actual heater temperatures. Based upon heater temperatures, the computer controls energization of the heaters until set points are achieved. Negative temperature coefficient and positive temperature coefficient transistors and semiconductors can be utilized.

17 Claims, 4 Drawing Sheets

METHOD AND APPARATUS FOR CALIBRATION AND CONTROLLING MULTIPLE HEATERS

CROSS REFERENCES TO APPLICATIONS

This patent application is a continuation-in-part of U.S. Ser. No. 08/182,716, filed Jan. 18, 1994, which is a continuation-in-part of U.S. Ser. No. 07/609,390, filed Nov. 5, 1990, now U.S. Pat. No. 5,280,422, for a "method and apparatus for calibrating and controlling multiple heaters" by the same inventors and assigned to the same assignee.

BACKGROUND OF THE INVENTION

1. Field of the Invention

The present invention relates to the temperature control of at least one and preferably, multiple electrical Resistance heaters such as heaters at nozzles and hot runner molds at different zones, or areas where use of sensors is not feasible.

2. Description of the Prior Art

At present time, the control of multiple heaters is accomplished through the use of a heater, sensor and controller for each zone. The present control system can cost from $10,000 to $15,000 for controls and sensors for a complex mold.

Integral heater/sensor control systems for multiple heaters are further complicated by the need to calibrate to the resistance of each heater in the system. At present, calibration accuracy is dependent upon how accurately the resistance of the heaters can be controlled and duplicated from one unit to another unit at a reference temperature. Any resistance variation will result in a different process temperature for the same set point as one heater is substituted for another. To overcome this disadvantage, it is necessary to manufacture heaters with close tolerance of the base resistance which necessarily increases the cost of the heater.

The present invention overcomes the disadvantages of the prior art by providing an integral heater/sensor control system for multiple heaters of the type and material as later discussed in detail with variable base resistance, and also eliminates the individual temperature sensors for each heater and all of the associated wiring and connectors for each heater zone.

SUMMARY OF THE INVENTION

The general purpose of the present invention is accomplished through the use of a microcomputer and multiplexer to control the process temperature of multiple heaters in a multi-zone heating system. The microcomputer, through a multiplexer, energizes each of the heaters in sequence. Current and voltage data are detected, and stored in the computer memory. Using this stored data, each of the heater's resistance is calculated. A temperature, usually room temperature at startup, is assigned to the calculated resistance. This then becomes the calibrated resistance value for each of the particular heaters. This calibrating process is then repeated for each heater in the system. In the run mode, current and voltage for each of the heaters is sensed, and the resistance calculated. This resistance is divided by the calibrated base resistance to obtain a normalized resistance ratio. The computer then compares the calculated ratio to a temperature ratio look-up table to determine actual heater temperature. The ratio look-up table can be n algorithm or algorithms stored in the microcomputer for the multiple heaters. The microcomputer, which can be a personal computer such as an IBM PC or one dedicated to this system, can control one heater or multiple heaters, or any other suitable computer for this application.

Heaters useable with the temperature controller of the present invention are, for example, cartridge, tubular, kapton, radiant, cast-in-heaters, thick and thin film heaters, cable heaters, silicon-rubber heaters, etc.

The temperature controller of the present invention is compatible with the above exampled heater types constructed of all types of positive and negative temperature coefficient heater materials. Typically, positive temperature coefficient materials may comprise: noble metals; metal alloys of platinum, nickel, chromium etc.; Balco, copper, platinum, nickel, chromel H, chromel B, chromel C, nickel-silicone, etc.; semiconductor materials such as silicon, germanium, gallium-arsenide, and derivatives.

The positive temperature coefficient materials may be in the form of thick films screened onto substrates for heaters and thin films placed on substrates as heaters. One such example of a material is conventionally aged silicon. example of a material is gold doped silicon.

The negative temperature coefficient materials may comprise; thermistor materials; semiconductor materials, thick film materials, screen onto substrates for heaters, and thin film materials placed on substrates as heaters. One such example of a material is gold doped silicon.

One significant aspect and feature of the present invention is a microcomputer system for calibrating and controlling multiple heaters. This also covers the special application of controlling only one heater.

Another significant aspect and feature of the present invention is a system which indicates that the control mode is ON/OFF. The heater is either cooler than setpoint (ON condition), or it is hotter than setpoint (OFF condition). This is a control concept. In actual operation, one can use a proportional control plus a special control algorithm to relate what the heater wire temperature must be to obtain a working temperature remote from the actual heater. This is the teaching of the present invention and can vary from application to application.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof;and wherein.

DETAILED DESCRIPTION OF THE PREFERRED EMBODIMENTS

Figure 1:
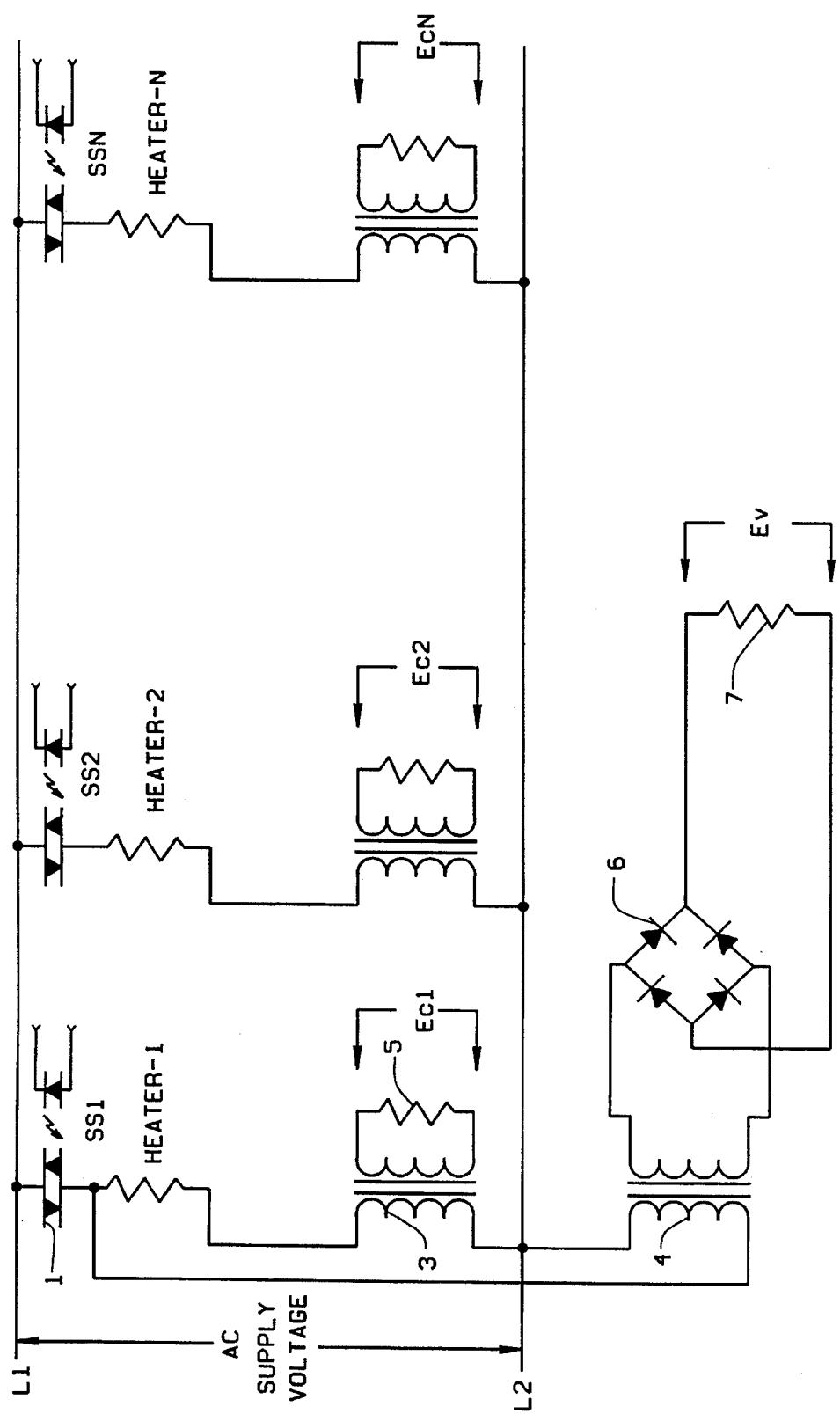
FIG. 1 illustrates a schematic diagram of the power control system including the heaters, the present invention.

FIG. 1 illustrates a schematic circuit diagram of a controlled A.C. supply voltage supplied to heaters 1, 2, . . . N on lines L1, L2. Power to heaters 1, 2, . . . N is controlled by solid state switches SS1, SS2 . . . SSN, respectively. Current, through each of the heaters 1, 2, . . . N, is detected by a current transformer 3 to develop signals Ec1, Ec2, . . . EcN for purposes to be described with reference to FIG. 2. In lieu of current transformers, other types of current sensors can be utilized, such as hall effect current sensors. Heater voltage Ev is developed by circuitry including transformers 4, rectifier 6 and resistance 7 for purposes to be described with reference to FIG. 2.

Figure 2:
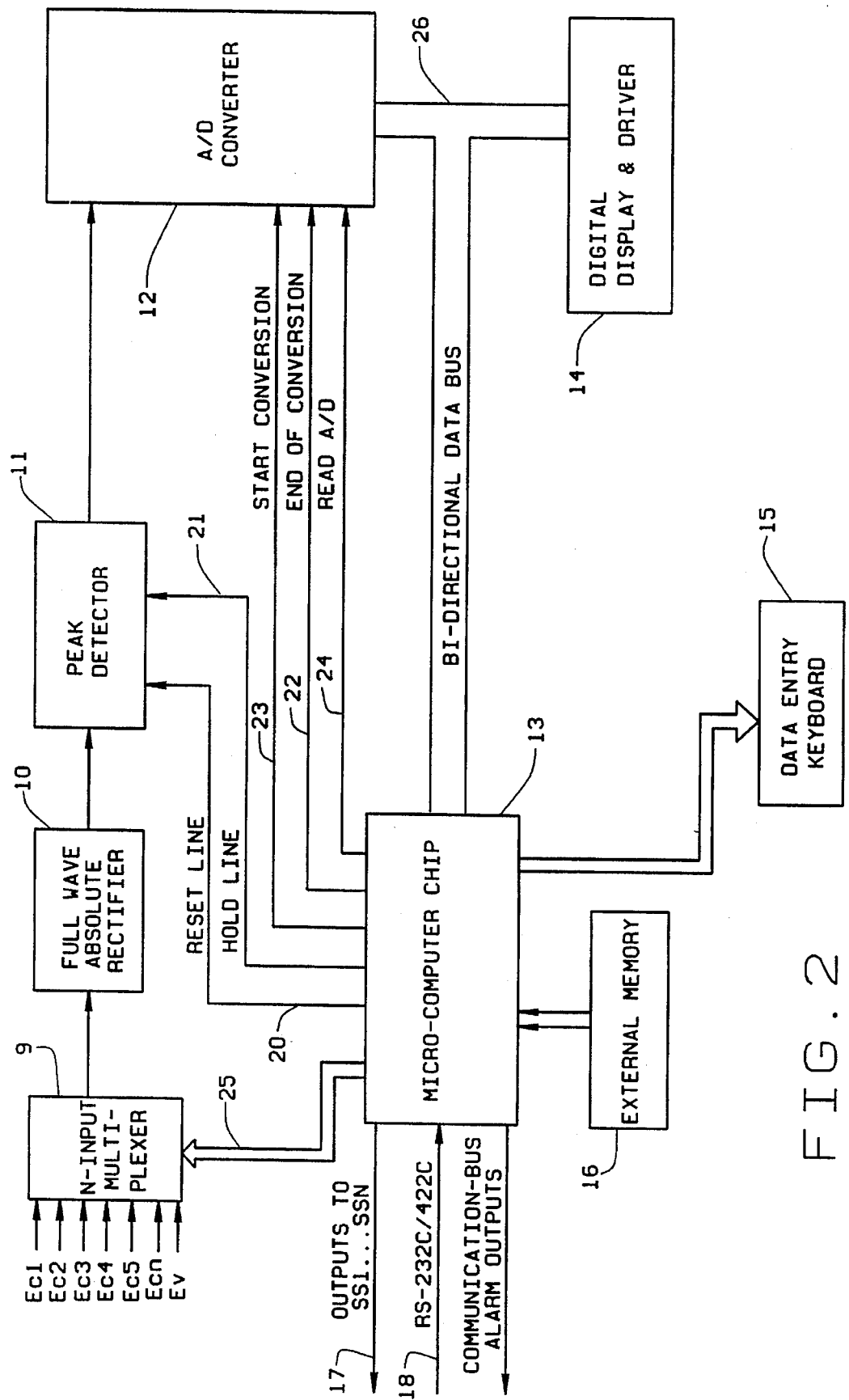
FIG. 2 illustrates a block diagram of the microcomputer control system for the power control system including the heaters.

FIG. 2 illustrates a block diagram of a microcomputer 13 used to control the energization of heaters 1, 2, . . . N. Switches SS1, SS2, . . . SSN are controlled by appropriate signals from multiplexer 9, bus 25, computer 13 and output lines 17 to the switches SS1 . . . SSN. Upon current flow through heater 1, the current is sensed by current transformer 3. The developed signal Ec1, from the transformer 3 is applied to multiplexer 9. The output from the multiplexer 9 is applied to rectifier 10 and peak detector 11, which is reset over line 20 by computer 13. Peak detector 11 is placed in a hold mode by computer 13 over line 21. The output of the peak detector 11 appears on the input of A/D converter 12. Computer 13 controls A/D converter 12 through end conversion and start conversion lines 22 and 23. Computer 13 reads converter 12 through read line 24. Data from converter 12 appears on data bus 26 for storage in the computer memory 16. Display 14 and keyboard 15 are available to the operator for entering process temperatures, set points and alarms. Communication bus 18 can be used to exercise control over the system through suitable software for applications such as data logging, trend analysis and statistical process control.

MODE OF OPERATION

Power is applied to the system. The computer initializes the system and goes through a diagnostic program to test system components. The computer 13 selects channel 1 by appropriate signals on the multiplexer bus 25. The computer then energizes switch SS1 via a signal on output bus 17 and resets peak detector 11 via reset line 20. Current now flows through heater 1. Current is sensed by transformer 3. The signal Ec1 from transformer 3 is applied to multiplexer 9, rectifier 10, and peak detector 11. The peak detector 11 is put in the hold mode over line 21, and its output appears on the input of A/D converter 12. The A/D converter 12 process is started by a computer pulse on start line 23. Upon completion of the process, a signal appears on end line 22. The data or converter 12 is read by computer 13 over read line 24 and stored in memory. Similarly, voltage would be read into the computer 13. The data then stored in memory could be either heater 1, current or voltage. The computer then calculates the resistance of heater 1 from its voltage and current. The computer then asks the operator, via display 14, to assign a temperature to the calculated resistance of heater 1. At startup, the assigned temperature will normally be room temperature. This then becomes the normalized calibrated resistance value for heater 1. The process is repeated until a calibrated resistance value has been derived for each heater or for the multiple heaters.

After calibration, the system asks the operator to enter control set points for each heater, as well as the type of alarms and their set points. The computer 13 may also accept input from the operator via keypad 15 on ramps, holds, etc., to generate specific recipe profiles based upon temperature, time or external input events. In the alternative, the operator can select a specific algorithm.

Once all data has been inputted, the system can be directed to run. The system is then under control of the computer 13 and its program memory 16. An algorithm or algorithms can be selected from stored software to control the integral heater/sensor operations. The display 14 and keypad 15 are available to the operator for entering process data and viewing heater temperatures, currents and resistance values.

When the system is in the run mode, the computer 13, through multiplexer 9, continuously checks each heater, measuring its current and voltage Ev. It then calculates its resistance value. Using this resistance value, it will divide it by the heater's calibrated resistance value to obtain a normalized resistance ratio value. Stored in the computer memory 16 is a look-up algorithm table having normalized resistance ratios for corresponding temperatures. The look-up table is unique to a particular heater wire. For example, for temperatures of 10°, 20°, 100°, 200°, 300° and 700° centigrade, the resistance ratios are 0.95, 1.00, 1.40, 1.97, 2.65 and 4.98 for a heater wire of Balco.

In a typical run mode for a set point of 200° C., the computer will calculate the normalized resistance ratios and compare this to 1.97. If the calculated ratio is smaller than 1.97, the heater will remain energized. If it is greater, the heater will be turned off via switch SS1. The actual process temperature can be derived by the computer through interpolation and displayed. The process is repeated for each heater as the system multiplexes from heater to heater. The actual sample time and time interval until a specific heater is again sampled will depend on the computer software and the A/D converter's clock and conversion rate. Typically each heater will be sampled every 0.1 to 0.5 seconds for a time period of 25 to 50 milliseconds.

During run, the computer will also compare the heater temperature to the alarm set points which, in the disclosed system, may vary from heater to heater. If the heater temperature exceeds the alarm set point, an alarm message will be displayed. If the heater current would measure zero amps, the computer would display an open heater circuit alarm message. If the heater voltage was read by the computer with zero current, an open heater message would be displayed. In addition, the system could sense SS1 switch failure by noting current flow when none is requested. In this manner, continuous monitoring of system components, together with logic software in the computer, can result in immediate information to the operator on system status.

While a specific embodiment has been described, various modifications are apparent in view of the teachings of this disclosure. For example, the computer 13 will support a communication link via communication bus 18 with an external computer system where data, system status and data storage can be achieved and used to publish graphs and reports. The external computer, typically a personal type computer, can be used to change set points, download profiles, and acknowledge alarms at a remote location.

Rather than have the operator enter the calibrator temperature, it is contemplated that an external temperature sensor and signal conditioner input the calibrator temperature directly through a separate process input to the computer 13. The computer 13 would then use this temperature for all heaters.

Still another modification would be to enter the actual heater resistance value of each heater at a reference temperature specified by the manufacturer.

FIRST ALTERNATIVE EMBODIMENT

Figure 3:
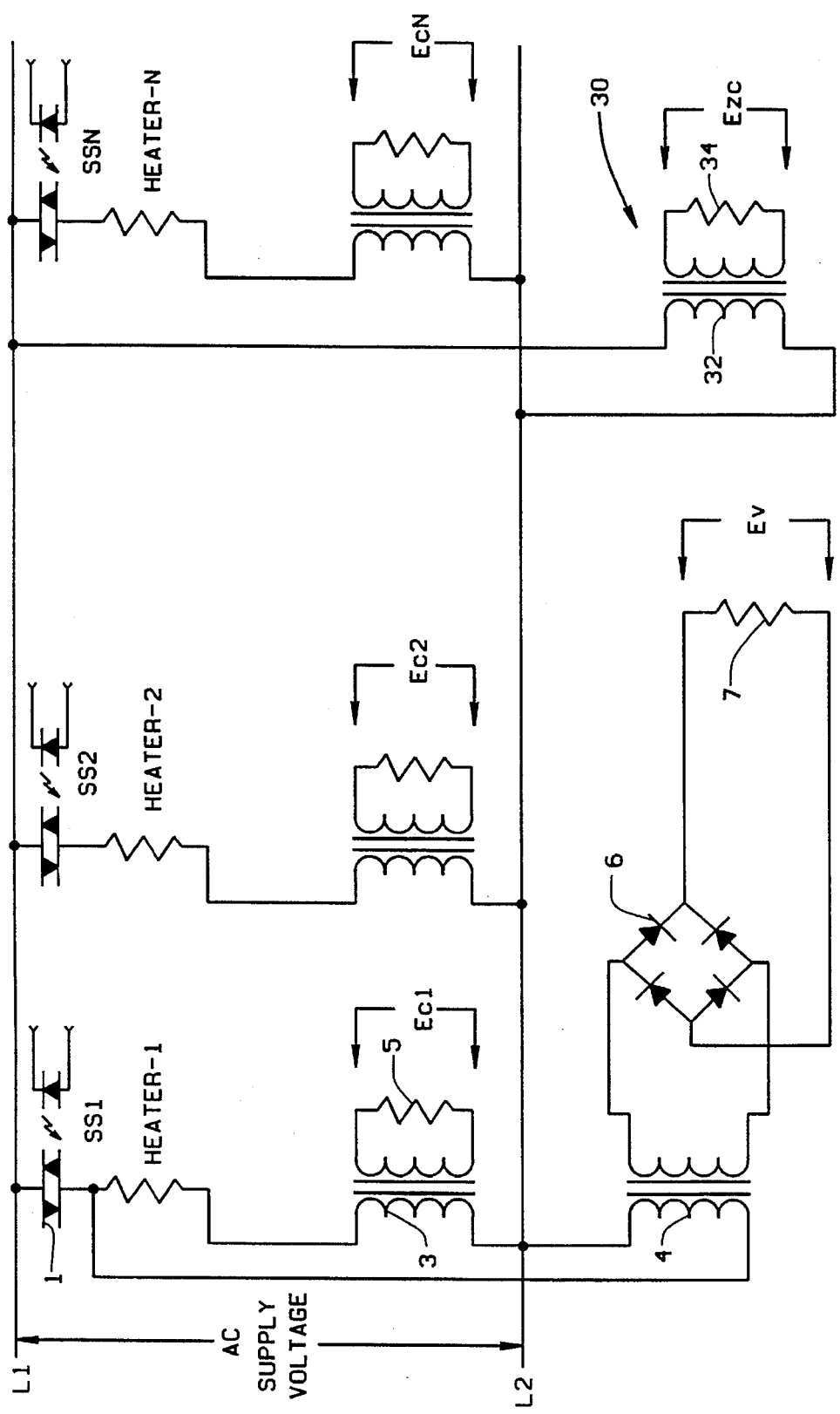
FIG. 3, an alternative embodiment, illustrates the elements of FIG. 1 and additionally includes zero cross circuitry; and, FIG. 4, an alternative embodiment, illustrates the elements of FIG. 2 and additionally includes a zero cross level conditioner, a full wave rectifier, a peak detector on an A/D switch or multiplexer.

FIG. 3, an alternative embodiment, illustrates the elements of FIG. 1, and additionally includes zero cross circuitry 30 where all numerals correspond to those elements previously described. The zero cross circuitry 30 includes a transformer 32 and resistor 34 to detect when the AC line voltage crosses the null or its common reference. The voltage EzC across the connected AC supply voltage is developed by the zero cross circuitry 30 including a transformer 32 and a resistor 34 for purposes later described with reference to FIG. 4. The signed EzC indicates the AC supply voltage. In order to more accurately control the solid state switches SS1 . . . SSN, the microprocessor 13 is provided with the line zero cross signal EzC, representing when the AC supply voltage is above, or below its reference, or common signal level. This signal is also used to determine when to activate the various modes of the peak detectors 11 and 40.

Figure 4:
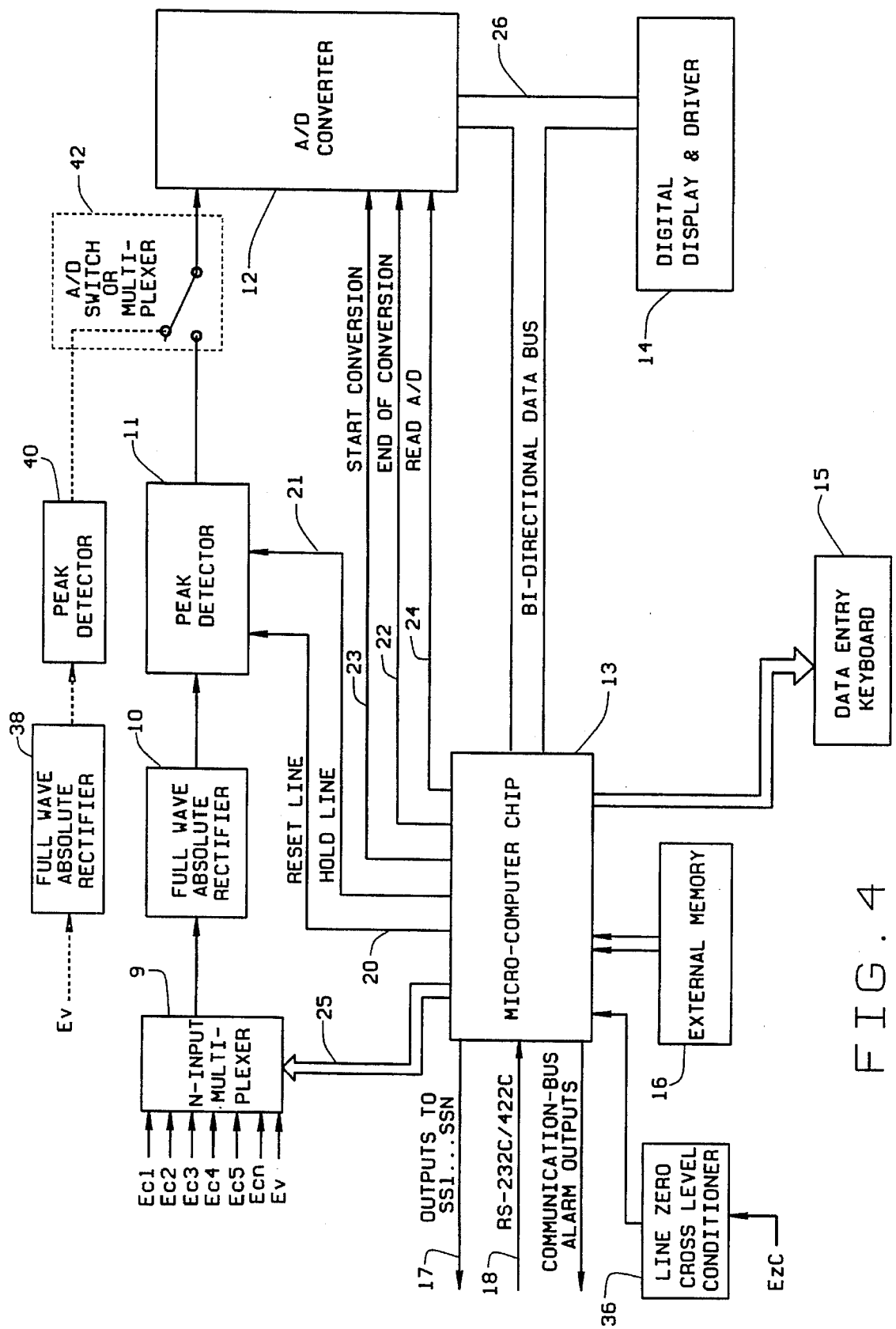

FIG. 4 illustrates the elements of FIG. 2, and additionally includes line zero cross level conditioner 36, a full wave absolute rectifier 38, a peak detector 40, and an A/D switch or multiplexer 42 where all numerals correspond to those elements previously described. The zero cross level conditioner 36 between the resistor 34 of FIG. 3 and the microprocessor 13 conditions the signal for microprocessor compatibility. The full wave absolute rectifier 38 and peak detector 40 form an optional second level detection circuit to allow the microprocessor 13 to simultaneously sample voltage (Ev) and one of the selected heater circuits. This method provides a more accurate method of computing heater resistance in that the voltage could change when one of the heater current signals Ec1 . . . EcN is being sampled. The optional full wave absolute rectifier 38 and peak detector 40 are available to provide simultaneous sampling of both the heater signal Ev and the selected heater current signal Ec1 . . . EcN. This option may be required if the supply voltage is changing significantly at the time when the heater current signal Ec1 . . . EcN is being sampled by the peak detector 11. The optional A/D switch or multiplexer 42 controlled by the microprocessor 13 connects the outputs of the peak detectors 11 and 40 to the A/D converter 12. Reference is further directed to Appendix 1.

Various modifications can be made to the present invention without departing from the apparent scope hereof.

I claim:

1. A process of calibrating and running a multiple positive temperature coefficient electrical resistance heater system comprising:

a. energizing a first heater;

b. sampling the energized first heater to determine voltage across the first heater and current through the heater;

c. calculating the first heater resistance;

d. assigning a temperature to the calculated first heater resistance to establish a calibrated normalized resistance value;

e. repeating steps a–d for each of the heaters;

f. establishing set points for each of the heaters;

g. sampling the first heater for current and voltage;

h. calculating the resistance of said first heater;

i. dividing the first heater calculated resistance of step c by the calculated resistance determined in step h to determine a normalized resistance ratio;

j. comparing the normalized resistance ratio of step "i" to a table of normalized resistance ratios at specific temperatures for the first heater material;

k. controlling heater energization based on the comparison of step "j";

l. repeating steps a–k for each of the heaters;

m. continuously sampling each of the heaters in sequence and repeating steps g–k at each sampling; and, n. simultaneously measuring peak voltage Ev and selected heater current EcN for measuring heater resistance.

2. The process of claim 1 wherein the positive temperature coefficient resistance heater comprises a noble metal.

3. The process of claim 1 wherein the positive temperature coefficient heater comprises a metal alloy from the group platinum, chromium and nickel.

4. The process of claim 1 wherein the positive temperature coefficient resistance heater is a metal selected from the group copper, platinum, nickel, chromel A, B, C.

5. The process of claim 1 wherein the positive temperature coefficient material is a semiconductor selected from the group comprising silicon, germanium and gallium-arsenide.

6. A process of calibrating and running a multiple negative temperature coefficient electrical resistance heater system and comprising:

a. energizing a first heater;

b. sampling the energized first heater to determine voltage across the first heater and current through the heater;

c. calculating the first heater resistance;

d. assigning a temperature to the calculated first heater resistance to establish a calibrated normalized resistance value;

e. repeating steps a–d for each of the heaters;

f. establishing set points for each of the heaters;

g. sampling the first heater for current and voltage;

h. calculating the resistance of said first heater;

i. dividing the first heater calculated resistance of step c by the calculated resistance determined in step h to determine a normalized resistance ratio;

j. comparing the normalized resistance ratio of step "i" to a table of normalized resistance ratios at specific temperatures for the first heater material;

k. controlling heater energization based on the comparison of step "j";

l. repeating steps a–k for each of the heaters;

m. continuously sampling each of the heaters in sequence and repeating steps g–k at each sampling; and, n. simultaneously measuring peak voltage Ev and selected heater current EcN for measuring heater resistance.

7. The process of claim 6 wherein said negative temperature coefficient electrical resistance heaters comprise thermistor materials.

8. The process of claim 6 wherein the negative temperature coefficient electrical resistance heaters comprise semiconductor materials.

9. The process of claim 6 wherein the negative temperature coefficient electrical resistance heaters are thick film materials screened onto substrates for use as heaters.

10. The process of claim 6 wherein the negative temperature coefficient electrical resistance heaters are thin film materials placed on substrates as heaters.

11. Apparatus for calibrating and controlling operation of multiple positive temperature coefficient electrical resistance heaters having power supply means and switch means for controlling the application of power to each of said heaters comprising:

a. means for detecting current through and voltage across each of the heaters;

b. a multiplexer coupled to said means for detecting;

c. means including converter means coupled to said multiplexer;

d. a programmed microcomputer having memory means and calculating means;

e. means coupling said microcomputer to said multiplexer, converter means, and detecting means for control thereof;

f. means connecting said microcomputer to said switch means for control thereof;

g. a look up table, having data relating temperature to normalized resistance rations for the specific material of the heaters, stored in said memory means;

h. keyboard means connected to said microcomputer;

i. means for simultaneously measuring peak voltage Ev and selected heater current EcN for measuring heater resistance; and, j. wherein when power is applied to the system, the microcomputer through control of the switch means, detector means, multiplexer means, and converter means calculates normalized resistance ratios for each of the heaters and compares such ratios to the look-up table ratios for control of heater energization through said switch means based on said comparison.

12. The apparatus of claim 11 wherein the positive temperature coefficient electrical resistance heaters are of a type selected from the group comprising cartridge, tubular, radiant, cast-in film, cable, and silicon rubber.

13. Apparatus for calibrating and controlling operation of multiple negative temperature coefficient electrical resistance heaters having power supply means and switch means for controlling the application of power to each of said heaters comprising:

a. means for detecting current through and voltage across each of the heaters;

b. a multiplexer coupled to said means for detecting;

c. means including converter means coupled to said multiplexer;

d. a programmed microcomputer having memory means and calculating means;

e. means coupling said microcomputer to said multiplexer, converter means, and detecting means for control thereof;

f. means connecting said microcomputer to said switch means for control thereof;

g. a look up table, having data relating temperature to normalized resistance rations for the specific material of the heaters, stored in said memory means;

h. keyboard means connected to said microcomputer;

i. simultaneously measuring peak voltage Ev and selected heater current EcN for measuring heater resistance; and, j. wherein when power is applied to the system, the microcomputer through control of the switch means, detector means, multiplexer means, and converter means calculates normalized resistance ratios for each of the heaters and compares such ratios to the look-up table ratios for control of heater energization through said switch means based on said comparison.

14. The apparatus of claim 13 wherein the negative temperature coefficient electrical resistance heaters comprise thermistor materials.

15. The apparatus of claim 13 wherein the negative temperature coefficient electrical resistance heaters comprise semiconductor materials.

16. The apparatus of claim 13 wherein the negative temperature coefficient electrical resistance heaters are thick film materials screened onto substrates for heaters.

17. The apparatus of claim 13 wherein the negative temperature coefficient electrical resistance heaters are thin film materials put onto substrates as heaters.

* * * * *